United States Patent [19]

Biedermann

[11] 4,218,133
[45] Aug. 19, 1980

[54] PHOTOGRAPHIC COPYING APPARATUS

[75] Inventor: Ernst Biedermann, Taufkirchen, Fed. Rep. of Germany

[73] Assignee: AGFA-Gevaert, A.G., Leverkusen, Fed. Rep. of Germany

[21] Appl. No.: 933,826

[22] Filed: Aug. 15, 1978

[30] Foreign Application Priority Data

Aug. 25, 1977 [DE] Fed. Rep. of Germany ....... 2738236

[51] Int. Cl.² .................. G03B 27/34; G03B 27/40
[52] U.S. Cl. ...................................... 355/56; 352/140; 354/25; 355/74
[58] Field of Search .................................. 355/55–63, 355/74; 354/25; 352/140, 70

[56] References Cited

U.S. PATENT DOCUMENTS

| 2,563,892 | 8/1951 | Waller et al. | 352/140 X |
| 2,737,081 | 3/1956 | Dowling | 352/140 X |
| 3,315,561 | 4/1967 | Boutique | 355/61 X |
| 3,627,411 | 12/1971 | Nagel | 355/74 X |
| 3,649,113 | 3/1972 | Harvey | 355/56 X |

FOREIGN PATENT DOCUMENTS 2536528 2/1977 Fed. Rep. of Germany .

Primary Examiner—Richard A. Wintercorn
Attorney, Agent, or Firm—Peter K. Kontler

[57] ABSTRACT

A photographic copying apparatus wherein a composite mask is installed between the plane of photographic paper and a variable-focus optical unit which images a light source or an original into the plane of photographic paper. The movable sections of the mask carry pairs of photodiodes. A control unit adjusts the optical unit when the latter projects light onto both photodiodes of each pair in a direction to reduce the projected image and in the opposite direction when none of the photodiodes are illuminated. The adjustment is terminated when the size of the projected image is such that only one diode of each pair is illuminated.

16 Claims, 4 Drawing Figures

PHOTOGRAPHIC COPYING APPARATUS

BACKGROUND OF THE INVENTION

The invention relates to photographic copying apparatus, and more particularly to improvements in photographic copying apparatus of the type wherein the light-transmitting opening between the original and the photosensitive image-receiving material is adjustable in dependency on the format of the original. Still more particularly, the invention relates to improvements in photographic copying apparatus wherein the original is imaged onto photosensitive material by a variable-focus optical system through the opening of a composite mask one or more sections of which can be shifted to change the size of the opening.

In presently known copying apparatus of the above outlined character, each change of format is followed by projection of the image of the original onto a circuit which is located in the plane of the photosensitive material. The attendant adjusts the variable-focus optical system until the size of the projected image on the screen matches the required dimensions. It is also known to calculate the necessary adjustment of the optical system for each desired size of the reproduction. Each of these procedures is time consuming and unreliable. In the first instance, inaccuracies are attributable to carelessness or lack of experience of the attendant and/or to fatigue (the attendant's eyes are likely to be tired after a relatively small number of adjustments). In the second instance, the calculated values are utilized to actuate the adjusting mechanism for the optical system. The accuracy of adjustment is limited, especially if the component parts of the mechanism are not machined and assembled with a high degree of precision. Furthermore, the number of possible adjustments of the optical system is very high. Thus, and assuming that the number of different formats is at least 27, that there are at least five different adjustments of the width of the exposed part of an original and at least four different widths of photographic paper, this would necessitate a total of 540 different adjustments of the variable-focus optical system.

OBJECTS AND SUMMARY OF THE INVENTION

An object of the invention is to provide a photographic copying apparatus with novel and improved means for automatically adjusting the variable-focus optical system in dependency on the selected size of the light-admitting opening.

Another object of the invention is to provide an apparatus wherein the adjustment of the optical system is effected with a minimum delay following a change of format and with a degree of accuracy which at least matches the accuracy of adjustment in accordance with heretofore known techniques.

A further object of the invention is to provide the copying apparatus with novel and improved means for adjusting the variable-focus optical system.

An additional object of the invention is to provide the copying apparatus with a novel and improved operative connection between the composite mask which defines the light-admitting opening and the variable-focus optical system.

Another object of the invention is to provide a photographic copying machine which can utilize an entire battery of variable-focus optical units.

A further object of the invention is to provide a photographic copying machine whose output is higher than the output of heretofore known copying machines with built-in variable-focus optical systems.

The invention is embodied in an apparatus for reproducing images of originals on photosensitive material. The apparatus comprises a suction chamber or other suitable means for positioning a sheet of photosensitive material in a predetermined plane, variable-focus optical means for imaging light rays which issue from a light source and which may but need not pass through an original onto the photosensitive material in such plane, motor means which is operable to adjust the focus of the optical means, a composite mask which is disposed intermediate the optical means and the plane, which defines a light-transmitting opening through which an original is imaged onto photosensitive material and which includes at least one section (e.g., an elongated strip or band) which is movable between a plurality of positions to thereby change the size of the opening, and control means for operating the motor means as a function of the selected position of the movable section of the mask. The control means comprises at least one light-sensitive signal generating element which shares the movements of the one section and respectively generates a signal and ceases to transmit such signal during those stages of adjustment of the optical means when the latter respectively projects and does not project light upon the signal generating element. The presence or absence of the signal causes the control means to operate the motor means so that the focal length of the optical means is a function of the selected size of the opening.

The mask may comprise first and second sections each of which is movable between a plurality of positions (such sections may make an angle of 90 degrees). The aforementioned signal generating element is then mounted on or otherwise shares the movements of one of the movable sections and the control means then preferably comprises at least one second signal generating element which shares the movements of the other section of the mask. The second signal generating element transmits a signal when it receives light through the optical means and ceases to transmit a signal when the size of the image projected by the optical means is reduced sufficiently to terminate the illumination of the second element. The control means then further comprises means (e.g., a group of relays) which operates the motor means in a selected direction or arrests the motor means in response to detection of different combinations of signals or in response to detected absence of signals. It is also possible to mount a group of signal generating elements on each movable section of the mask and to move the optical means in a first direction when all of the elements transmit signals, to move the optical means in the opposite direction when none of the elements transmit signals and to arrest the motor means when at least one first element of each group transmits a signal while at least one second element of each group does not transmit a signal. Still further, the control means can be designed in such a way that it causes the motor means to move the optical means at a first speed in one direction and at a higher second speed in the opposite direction. For example, if the optimum position of the optical means is such that an edge of the image which is projected by the optical means is located between two elements on a common movable section of the mask, the control means can start the motor means at a high speed when the two elements transmit signals and reverses the direction of movement of motor means when both elements cease to transmit signals. The movement of motor means in reverse is slow and is terminated automatically when one of the elements begins to transmit signals.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
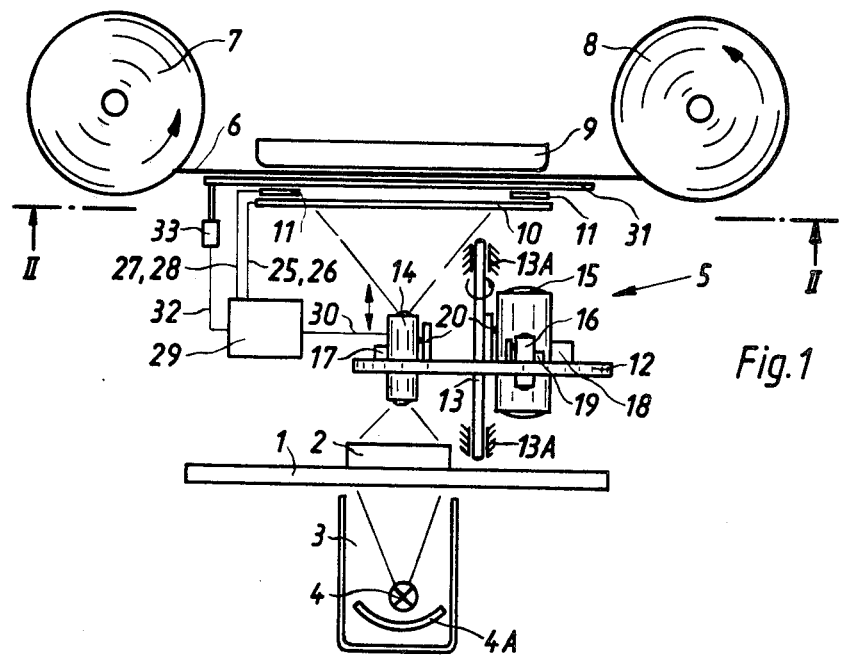
FIG. 1 is a schematic elevational view of a portion of a photographic copying apparatus which embodies the invention.

FIG. 1 shows a work table or platform 1 of a photographic copying apparatus. The table 1 serves as a support for an adjustable or interchangeable holder 2 of originals whose images are to be projected onto a web or sheet 6 of photosensitive material. The holder 2 determines the dimensions of that part of an original therein whose image is reproduced on the web 6. The table 1 is located at a level above a lamp housing 3 containing a light source 4 and a reflector 4A. The light issuing from the source 4 impinges directly on the underside of the original in the holder 2 or is reflected by the reflector 4A and/or the light duct of the lamp housing 3. A variable-focus optical unit 14 is disposed between the holder 2 and the web 6 to focus the image of the original onto the photosensitive material. The distance between the original in the holder 2 and the plane of the web 6 is constant. The lamp housing 3 further contains or cooperates with additional customary components of the photographic copying apparatus, such as a shutter, filters and others.

The optical unit 14 forms a part of an optical system 5 which further includes two additional variable-focus optical units 15 and 16. The units 14–16 are mounted on a turret 12 whose vertical shaft 13 is mounted in bearings 13A and which is indexible, either by hand or automatically, to place a selected variable-focus optical unit 14, 15 or 16 into the space between the holder 2 and the plane of the web 6. The latter is drawn off a supply reel 7 and is collected by a takeup reel 8 at necessary intervals, i.e., prior to each exposure. In order to insure that the image-receiving portion of the web 6 will be held in a predetermined plane during imaging of an original, the apparatus comprises positioning or locating means here shown as a suction chamber 9 having a foraminous wall 9A (FIG. 2) adjacent to the rear (upper) side of the web 6 between the reels 7 and 8. It is assumed that the web 6 consists of photographic paper.

The means for selecting the dimensions of reproductions of originals on the web 6 comprises a composite mask including a first pair of parallel belt- or strip-shaped sections 10 and a second pair of parallel belt- or strip-shaped sections 11 which make an angle of 90 degrees with the sections 10. The sections 10 and 11 can be moved by hand or by a drive in directions indicated by double-headed arrows 10A, 11A to thereby vary the size of the opening OP through which the selected optical unit 14, 15 or 16 projects the image of the original onto that portion of the web 6 which is attracted to the wall 9A of the suction chamber 9. The manner in which the mask including the movable sections 10 and 11 can be adjusted in dependency on the format of the original is disclosed, for example, in commonly owned U.S. Pat. No. 3,627,411 granted Dec. 14, 1971 to Erich Nagel. Another mechanism for adjustment of movable sections of a mask is disclosed in commonly owned German Offenlegungsschrift No. 2,536,528. However, and as mentioned above, it is equally within the purview of the invention to move the sections 10 and/or 11 of the mask by hand.

The means for adjusting the focal length of the optical units 14, 15, 16 respectively comprises reversible motors 17, 18, 19 which are mounted on the turret 12 and can be connected with a control unit 29 which varies the focal length of the selected optical unit (e.g., 14) by way of the respective motor (17) in dependency on adjustment of the mask including the sections 10 and 11. The reference characters 20 denote guide means for the movable portions of the optical units 14–16. An adjustment of the optical unit 14, 15 or 16 may involve axial movement of the entire barrel for optical elements or the adjustment of certain optical elements in the barrel. A suitable optical system with motor means for changing the focal length of portions of or entire optical units is disclosed, for example, in U.S. Pat. No. 3,884,555 granted May 20, 1975 to Suwa et al.

Figure 2:
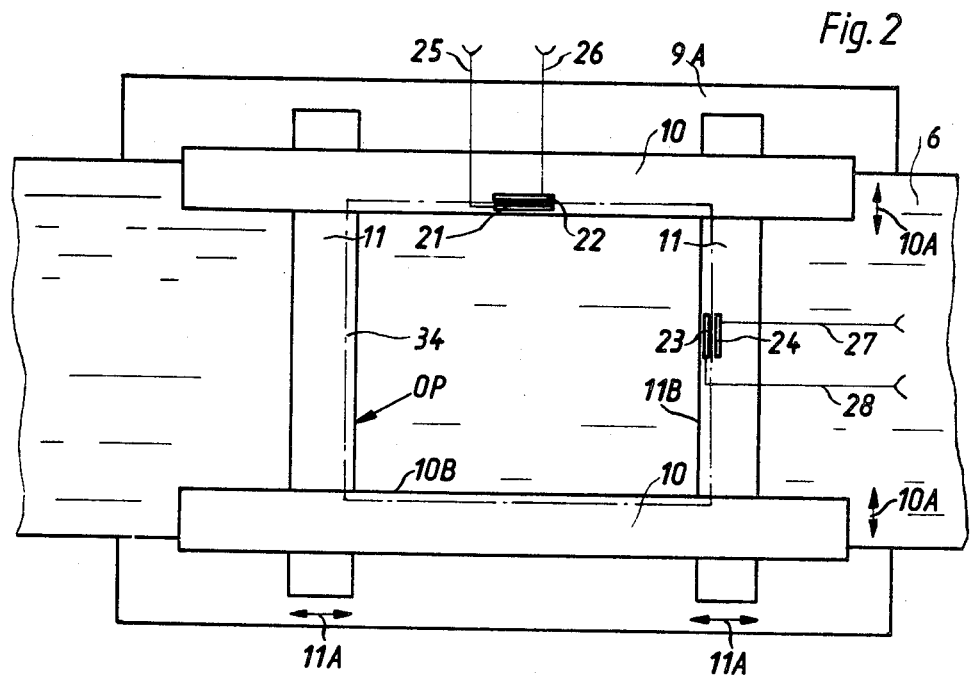
FIG. 2 is an enlarged view as seen in the direction of arrows from the line II—II of FIG. 1.

FIG. 2 shows that the opening OP is bounded by the inner marginal portions 10B and 11B of the movable sections 10 and 11. These sections are located in front of that portion of the web 6 which is attracted to the wall 9A of the suction chamber 9.

The upper section 10 of the mask (as viewed in FIG. 2) carries two elongated photosensitive signal generating elements 21 and 22 which are disposed substantially midway between the sections 11 and are parallel to each other as well as to the marginal portion 10B of the respective section 10. The distance between the inner element 21 (i.e., that element which is nearer to the opening OP) and the marginal portion 10B is between 1–2 millimeters, the same as the distance between the elements 21 and 22. The width of each of the elements 21, 22 at least equals the just mentioned distance.

The right-hand section 11 of the mask also carries two signal generating photosensitive elements 23, 24 which are located substantially midway between the sections 10 and are parallel to each other as well as the marginal portion 11B of the respective section 11. The distance between the inner element 23 and the marginal portion 11B, the distance between the elements 23, 24 and the width of each of these elements can be selected in the same way as described in connection with the elements 21, 22 and the upper section 10 of FIG. 2.

The elements 21–24 form parts of the control unit 29 and are connected with certain other components of this unit by conductor means 25, 26, 27, 28. At least a portion of each of these conductor means is flexible or includes telescoped parts to allow for sidewise movement of the corresponding sections 10, 11 between a plurality of positions. The conductor means 30 connects an output of the control unit 29 with the motor 17, 18 or 19 of that optical unit 14, 15 or 16 in the system 5 which is disposed between the holder 2 and the mask 10, 11.

Another output of the control unit 29 is connected with a motor 33 by conductor means 32. The motor 33 can rotate or pivot a disk-shaped light-intercepting shutter 31 into or out of the narrow clearance between the sheet 6 and the mask 10. It is clear that the disk-shaped shutter 31 can be replaced by a curtain, by a reciprocable plate or by any other suitable light intercepting means which can be moved into and from the space between the opening OP and the web portion in front of the suction chamber 9.

The operation is as follows:

When an attendant places a new holder 2 onto the table 1, the control unit 29 actuates the motor 33 via conductor means 32 to move the shutter 31 to the operative position which is shown in FIG. 1. The switch for the light source 4 is turned on and a shutter (not shown) in front of the selected optical unit (14) is opened so that the image of the original in the holder 2 is projected onto the shutter 31 via opening OP. Thus, the original is imaged onto the shutter 31 and, in the absence of appropriate adjustment of the unit 14, onto the sections 10, 11 of the mask (either to an excessive or to an insufficient degree). If none of the signal generating elements 21-24 are illuminated, the projected image is too small. The elements 21-24 do not transmit signals to the control unit 29 whereby the unit 29 starts the motor 17 in a direction to enlarge the image on the shutter 31. When the light issuing from the source 4 impinges on the inner elements 21, 23, the control unit 29 arrests the motor 17. Thus, the motor 17 is arrested when one of each pair of elements 21, 22 and 23, 24 (namely, the element nearer to the opening OP) transmits a signal. This is the optimum adjustment of the optical unit 14.

If the projected image is too large, all four elements 21-24 transmit signals whereby the control unit 29 starts the motor 17 in the opposite direction to reduce the size of the projected image. The motor 17 is arrested when the projected image is reduced to such an extent that the outer elements 22, 24 cease to transmit signals. It is assumed that the mask 10, 11 has been adjusted to define an opening of optimum size, e.g., in automatic response to placing of a different holder 2 onto the table 1.

The control unit 29 thereupon causes the motor 33 to move the shutter 31 to the inoperative position and to turn off the light source 4. The exposure of the original in the holder 2 onto the web portion in front of the chamber 9 then proceeds in the customary way.

Since the distance or clearance between the elements 21, 22 and 23, 24 is small, the speed of the motor 17 is preferably low whenever this motor is on either because all four or none of the elements 21-24 transmit signals. This insures that the motor 17 does not move a portion of or the entire optical unit 14 beyond the optimum position. On the other hand, slow adjustment of the unit 14 takes up a relatively long interval of time. Therefore, it is advisable to design the control unit as follows: The motor 17 is driven at a high speed when all four elements 21-24 transmit or do not transmit signals. The motor 17 is arrested and the direction of its movement reversed as soon as the other extreme is reached, i.e., when instead of four signals the control unit does not receive any signals and vice versa. The movement of the motor 17 in the opposite direction is slower and is terminated when one (21, 23) of each pair of elements 21-24 transmits a signal. The optimum size of the image is shown in FIG. 2, as at 34.

It is further clear that the control unit 29 can be modified to activate the motor 17 solely in response to signals from the elements 21, 22 or 23, 24. This is the case when the length or width of the reproduction need not be changed, i.e., when a change of format merely entails a change in the ratio of length-to-width of the opening OP.

The control unit 29 can effect any desired number of adjustments of the optical unit 14, 15 or 16 including such adjustments which are not necessary in presently used photographic copying apparatus but are likely to be needed in future developments of such apparatus. Furthermore, one or more sections of the mask can carry three or more signal generating elements or a single signal generating element, depending on the desired degree of accuracy of adjustment of the optical unit 14, 15 or 16. One of these units can be used for focusing within a selected normal range, another optical unit can used for focusing beyond the normal range, and the third optical unit can be used for focusing at a distance closer than the normal range.

An important advantage of the improved apparatus is that the selected optical unit is automatically adjusted to insure the making of reproductions having a desired size so that the quantity of material which must be removed from the exposed web during trimming of the prints is nil or negligible. Also, the apparatus is simple and reliable and the interval of adjustment of the selected optical unit following a change of format is short. The elements 21-24 may constitute simple commercially available photocells or analogous photosensitive signal generating means which form part of a relatively simple and compact control unit.

Figure 3:
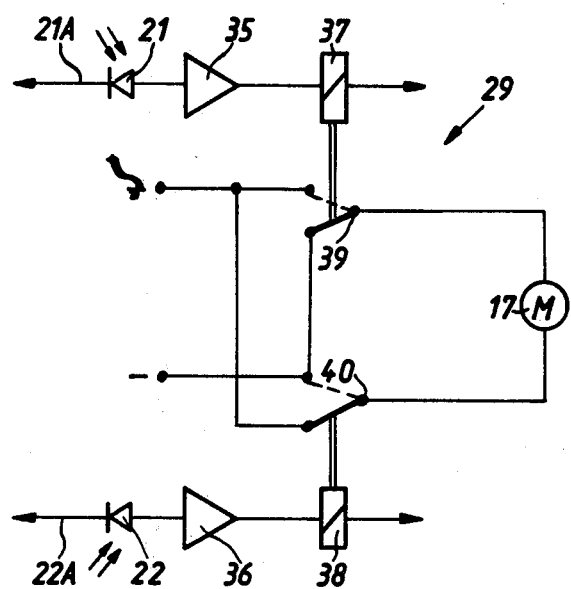
FIG. 3 is a diagram of a first control circuit for the motor means which adjusts the variable-focus optical system.

FIG. 3 shows certain details of the control unit 29, i.e., of a control unit which can operate the motor (17, 18 or 19) for the selected optical unit in different directions but at a constant speed. For the sake of simplicity, FIG. 3 merely shows the signal generating elements 21 and 22 on the corresponding movable section 10 of the mask. Each of these elements 21, 22 is a photodiode which is connected to a source of energy by conductor means 21A, 22A. The element 21 transmits signals to an amplifier 35 which energizes a relay 37 whenever its input receives a signal, i.e., when the element 21 is exposed to light issuing from the source 4. Analogously, an amplifier 36 energizes a relay 38 when it receives a signal from the element 22. In FIG. 3, the elements 21 and 22 are exposed to light which issues from the source 4. Therefore, the relays 37, 38 respectively maintain their switches 39, 40 in the illustrated positions in which the switches 39, 40 connect the motor 17 with the positive and negative poles of an energy source in such a way that the current flows in a first direction, i.e., the motor 17 operates the optical unit 14 in a sense to reduce the size of the image 34.

When the initial size of the image 34 is so small that the light rays issuing from the source 4 cannot reach the elements 21, 22, the movable contacts of the switches 39, 40 assume the broken-line positions because the relays 37, 38 are deenergized. The circuit of the motor 17 is completed; however, the direction of current flow is reversed and the motor 17 adjusts the optical unit 14 in a sense to increase the size of the image 34. FIG. 3 further shows that the motor 17 is automatically arrested when only one of the relays 37, 38 is energized.

Figure 4:
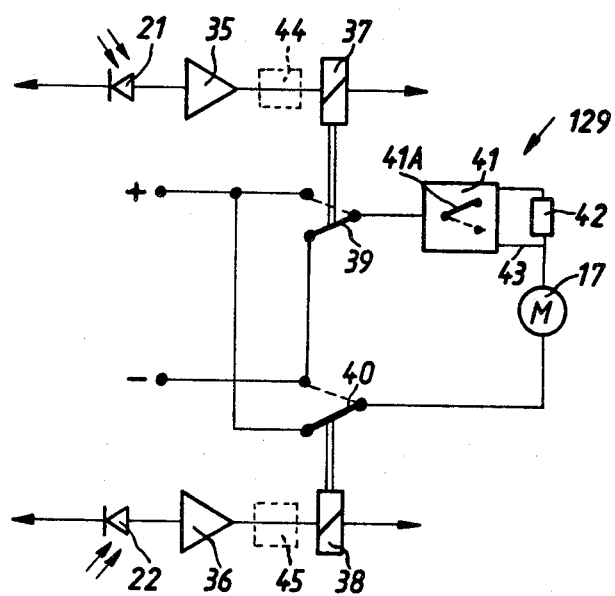
FIG. 4 is a diagram of a modified control circuit for the motor means which serves to adjust the variable-focus optical system.

FIG. 4 illustrates a modified control unit 129 which can cause the motor 17 to rotate at a first speed in one direction and at a different second speed in the opposite direction. The elements 21, 22, the amplifiers 35, 36, the relays 37, 38 and the relay switches 39, 40 are assembled in the same way as the corresponding parts of the control circuit 29. The circuit 129 further comprises a resistor 42 in series with the motor 17 and a switchover device 41 which can connect the switch 39 with the motor 17 via resistor 42 (lower speed) or via conductor means 43, i.e., while bypassing the resistor 42 so that the motor 17 is driven at a higher speed. The higher speed is selected in such a way that, even though the circuit of the motor 17 is open as soon as one of the elements 21, 22 ceases to transmit a signal or begins to transmit a signal (while the other of these elements respectively continues to transmit or ceases to transmit a signal), the inertia of the motor 17 suffices to proceed with adjustment of the optical unit 14 to the other extreme. Thus, and assuming that the motor 17 is operated at the higher speed when the elements 21, 22 do not transmit any signals (the size of the image 34 too small), the motor 17 is arrested when the elements 21 and 22 transmit signals to the respective amplifiers 35, 36. The direction of rotation of the motor 17 is then reversed for reasons which will be readily understood by looking at FIG. 4. However, the movable contact 41A of the switchover device 41 is then moved from the broken-line to the solid-line position of FIG. 4 so that the resistor 42 is connected in series with the motor 17 and the motor is driven at the lower speed. The switchover device 41 may be any one of many commercially available components which respond to changes of potential to move the contact 41A between solid-line and phantom-line positions.

Instead of relying on inertia of the motor 17, it is also possible to install time-delay devices between the amplifiers 35, 36 and the corresponding relays 37, 38 to insure that the changes in condition of such relays take place with a delay which is necessary to operate the motor 17 for a period of time subsequent to start of simultaneous transmission of signals by the elements 21 and 22. Such time-delay devices are shown by broken lines, as at 44 and 45, because they are optional.

The reason for respectively placing the signal generating elements 21, 22 and 23, 24 close to each other is that such arrangement facilitates the selection of desired size of an image 34 with a high degree of accuracy. Thus, the size of the image 34 is proper when the light rays issuing from the source 4 illuminate the elements 21, 23 but not the elements 22, 24. The range of tolerances is limited by the narrow clearance between the elements 21, 22 and 23, 24.

Elongated signal generating elements are preferred because they reduce the likelihood of accidental generation or interruption of generation of signals. For example, impingement of light upon a small circular, square or triangular signal generating element could be prevented by a small particle of foreign matter at a time when two edges of the image 34 do not extend between the elements 21, 22 and 23, 24. The likelihood of accidental interruption of light which impinges upon an elongated signal generating element which is parallel to the respective marginal portion (10B, 11B) of the corresponding section of the mask (and hence to the corresponding edge of the image 34) is very remote.

Another reason for employing elongated signal generating elements is that they are less likely to be shielded from light by a small dark spot of the original in the holder 2. Though it is possible to adjust an optical unit while the holder 2 on the table 1 is empty, it is preferred to make such adjustment while the holder 2 contains a properly inserted original. As mentioned above, a dark portion of such original could prevent light rays which issue from the source 4 from impinging upon a relatively small signal generating element. It has been found that the relatively large light-sensitive surface of an elongated photosensitive signal generating element can receive adequate quantities of light even if the element is in line with a dark spot of the original in the holder 2.

The mounting of elements 21, 23 at a certain but small distance from the marginal portions 10B, 11B of the respective sections 10, 11 is desirable in order to reduce the likelihood of blurring the edge portions of a reproduction on the web 6. It has been found that a distance in the range of 1–2 millimeters is quite satisfactory.

The improved apparatus is susceptible of many further modifications without departing from the spirit of the invention. For example, the control unit 29 or 129 can serve to adjust the position of the entire turret 12 in the axial direction of the shaft 13 instead of moving the barrels or other parts of discrete optical units. Furthermore, a single motor can be utilized to adjust any one of two or more optical units.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for reproducing images of originals on photosensitive material, comprising means for positioning a sheet of photosensitive material in a predetermined plane; a source of copying light; variable-focus optical means for imaging light issuing from said source onto the photosensitive material in said plane in the form of a light beam the outer boundaries of which are determined by the position of the focus of the optical means a composite mask disposed intermediate said optical means and said plane, said mask defining a light-transmitting opening and including at least one section movable between a plurality of positions to thereby change the size of said opening; motor means operative for adjusting the position of the focus of said optical means with attendant change in cross section of the light beam at said composite mask; and control means for operating said motor means as a function of the selected position of said section, said control means including at least one light-sensitive signal generating element which shares the movements of said section and respectively generates and ceases to generate signals during those stages of adjustment of said optical means when said optical means respectively images and does not image light upon said element.

2. Apparatus as defined in claim 1, wherein said mask includes first and second sections each of which is movable between a plurality of positions and said signal generating element shares the movements of one of said sections, said control means further comprising at least one second signal generating element sharing the movements of the other of said sections, said second element being operative to generate a signal when exposed to light which is imaged by said optical means and to cease the transmission of such signal when the exposure to light is terminated.

3. Apparatus as defined in claim 2, wherein said sections of said mask are elongated and make an angle of approximately 90°.

4. Apparatus as defined in claim 2, wherein said control means comprises a plurality of signal generating elements on each of said sections.

5. Apparatus as defined in claim 4, wherein said sections are strips.

6. Apparatus as defined in claim 4, wherein said sections comprise elongated marginal portions bounding the respective parts of said opening and said sections are movable in directions substantially at right angles to the respective marginal portions, said signal generating elements having elongated light-sensitive portions extending in substantial parallelism with and being adjacent to the respective marginal portions.

7. Apparatus as defined in claim 6, wherein said signal generating elements comprise parallel first and second elements mounted on said one section and defining a clearance having a width of 1–2 millimeters, and parallel third and fourth elements mounted on said other section and defining a clearance having a width of 1–2 millimeters.

8. Apparatus as defined in claim 7, wherein the marginal portion of each of said sections is inwardly adjacent to the respective signal generating elements and is spaced apart from the nearest element by a distance of 1–2 millimeters.

9. Apparatus as defined in claim 1, wherein said control means comprises first and second signal generating elements and said motor means is operative to move at least a portion of said optical means in a first direction in response to signals from said first and second elements and in a second direction in the absence of signals from said first and second elements, said motor means being idle when only one of said first and second elements transmits signals.

10. Apparatus as defined in claim 9, wherein said one of said first and second elements is nearer to said opening than the other of said first and second elements.

11. Apparatus as defined in claim 1, wherein said optical means comprises a plurality of variable-focus optical units each of which is movable between said mask and the original.

12. Apparatus for reproducing images of originals on photosensitive material, comprising means for positioning a sheet of photosensitive material in a predetermined plane; a source of copying light; variable-focus optical means for imaging light issuing from said source onto the photosensitive material in said plane; motor means operable to adjust the focus of said optical means; a composite mask disposed intermediate said optical means and said plane, said mask defining light-transmitting opening and including at least one section movable between a plurality of positions to thereby change the size of said opening; and control means for operating said motor means as a function of the selected position of said section, said control means including first and second light-sensitive signal generating elements which share the movements of said section and respectively generate and cease to generate signals during those stages of adjustment of said optical means when said optical means respectively images and does not image light upon said elements, said motor means being arranged to move at least a portion of said optical means in a first direction at a first speed in response to generation of signals by said first and second elements and in a different direction at a second speed in response to the absence of signals from said first and second elements.

13. Apparatus as defined in claim 12, wherein said first element is nearer to said opening than said second element and said control means further comprises means for arresting said motor means in response to the generation of a signal by said first element in the absence of a signal from said second element.

14. Apparatus for reproducing images of originals on photosensitive material, comprising means for positioning a sheet of photosensitive material in a predetermined plane; a source of copying light; variable-focus optical means for imaging light issuing from said source onto the photosensitive material in said plane, including a plurality of variable-focus optical units, motor means operable to adjust the focus of said optical means; a composite mask disposed intermediate said optical means and said plane, said mask defining a light-transmitting opening and including at least one section movable between a plurality of positions to thereby change the size of said opening; control means for operating said motor means as a function of the selected position of said section, said control means including at least one light-sensitive signal generating element which shares the movements of said section and respectively generates and ceases to generate signals during those stages of adjustment of said optical means when said optical means respectively images and does not image light upon said element; and an indexible turret, said optical units being mounted on and being indexible with said turret, and movable between said mask and the original.

15. Apparatus as defined in claim 14, wherein said turret is movable axially.

16. Apparatus as defined in claim 15, wherein said control means comprises means for moving said turret axially.

* * * * *